United States Patent
Barritz

(10) Patent No.: US 6,600,419 B2
(45) Date of Patent: Jul. 29, 2003

(54) METHOD FOR DETERMINING IF A PUBLICATION HAS NOT BEEN READ

(75) Inventor: Robert Barritz, New York, NY (US)

(73) Assignee: Treetop Ventures LLC, Syosset, NY (US)

( * ) Notice: Subject to any disclaimer, the term of this patent is extended or adjusted under 35 U.S.C. 154(b) by 358 days.

(21) Appl. No.: 09/773,144

(22) Filed: Jan. 31, 2001

(65) Prior Publication Data

US 2001/0033229 A1 Oct. 25, 2001

Related U.S. Application Data

(60) Provisional application No. 60/178,956, filed on Feb. 1, 2000.

(51) Int. Cl.$^7$ .............................................. G08B 13/14
(52) U.S. Cl. ............................ 340/572.1; 340/572.8; 434/236
(58) Field of Search ........................ 340/572.1, 572.8, 340/693.5, 568.1; 434/236

(56) References Cited

U.S. PATENT DOCUMENTS

| | | | | |
|---|---|---|---|---|
| 4,659,314 A | * | 4/1987 | Weinblatt | 434/236 |
| 4,726,771 A | * | 2/1988 | Weinblatt | 434/236 |
| 4,781,596 A | * | 11/1988 | Weinblatt | 434/236 |
| 4,939,326 A | * | 7/1990 | Weinblatt | 200/506 |
| 5,019,679 A | * | 5/1991 | Weinblatt | 200/508 |
| 5,234,345 A | * | 8/1993 | Weinblatt | 434/236 |

* cited by examiner

Primary Examiner—Nina Tong
(74) Attorney, Agent, or Firm—Ostrolenk, Faber, Gerb & Soffen, LLP

(57) ABSTRACT

A system and method for monitoring and for obtaining statistical information about the level of readership of promotional materials, includes providing with promotional materials RF ID tags which only become deactivated when a reader has opened the promotional material. Non-opened promotional material which has been discarded is scanned with a receiver/scanner device which identifies the promotional material pieces that have not been opened, including, optionally, the identity of the addressees who have not opened the promotional materials. Thus, statistical information and profile information is developed which improves the ability of targeting individuals for receipt of promotional materials.

13 Claims, 2 Drawing Sheets

Active and Passive Style Tags

Figure 1 - Active and Passive Style Tags

METHOD FOR DETERMINING IF A PUBLICATION HAS NOT BEEN READ

RELATED APPLICATION

This Application claims priority and is entitled to the filing date of U.S. Provisional Application Ser. No. 60/178,956 filed Feb. 1, 2000, and entitled "METHOD FOR DETERMINING IF A PUBLICATION HAS NOT BEEN READ".

BACKGROUND OF THE INVENTION

The present invention is generally directed to a monitoring system and, more particularly, to a method and device for determining if a publication has not been read.

Retailers routinely mail a large volume of unsolicited catalogs and other sales literature to consumers or to the current resident. In many cases, the catalogs are thrown away in the trash, often times without ever being perused. As the typical response rate from direct mailings is about 2–3%, one would surmise that a large percentage, perhaps as many as 80–90%, of these catalogs are never even read. are generally retained on the mailing lists. Consumers from whom there has been no response are often times dropped from mailing lists after only a few mailings.

While it is important for retailers to know if consumers like or dislike their catalogs, the only feedback other than direct response is to conduct costly marketing research studies.

By concentrating their marketing efforts on active consumers, retailers reduce their advertising costs as a trade-off to increasing their customer base. But, after a period of time, retailers will once again resort to large volume mailings, many of which will go unread.

For companies like Lands End, which sends out 250,000,000 catalogs per year, the ability to refine their mailing list to consumers that are more likely to read their catalog would produce a tremendous cost savings while, at the same time, continue marketing to potential customers.

In the prior art, the problem of statistically surveying the readership of magazines (U.S. Pat. No. 4,726,771) has been addressed by inserting a switch and transmitter into the publication. When the magazine is opened, the switch activates the transmitter which in turn sends an identifying signal to a wristwatch type of device that records the event. Such a system is not suitable for the determination of catalog readership because it requires the need to deploy costly wristwatch receivers and to enlist the cooperation of most, if not every, consumer that receives a catalog. If cost were not a factor, the requirement to enlist every consumer is by itself a severe impediment.

Reference is made herein to U.S. Pat. Nos. 4,726,771; 4,781,596 and 5,019,679, which contain disclosure related to the present application. Accordingly, the contents of the aforementioned three patents is incorporated by reference herein.

While the RF ID tag has been described above as comprising a mechanical seal or switch on the cover of a magazine or catalog, such a device can be applied to require the breaking of a seal in order to read or leaf through pages of the catalog or the magazine included within or between the covers.

SUMMARY OF THE INVENTION

Accordingly, it is an object of the present invention to provide the method and system which provides improved feedback to retailers concerning the reading of their mass mailed catalogs.

It is another object of the invention to provide the method and system which enables retailers to obtain quantitative data concerning the readership of their catalogs.

Yet another object of the invention is a method and system which enables retailers to obtain specific information about where their catalogs are mailed and who reads them.

The foregoing and other objects of the invention are realized by the method and system in accordance with the present invention in which mass mailed catalogs, promotional literature and the like incorporate RF ID tags containing and capable of wirelessly transmitting identification codes which identify the catalogs with which they are associated, as well as the addressees on the catalogs. With the invention, retailers, marketers and other organizations are provided with a better system and means for determining who, when and where their catalogs are being or are not being read or reviewed.

Other features and advantages of the present invention will become apparent from the following description of the invention which refers to the accompanying drawings.

DESCRIPTION OF THE INVENTION

The present invention achieves its objectives by directly, and without consumer involvement, determining which catalogs have not been read.

In a preferred embodiment, a retailer incorporates into each catalog an RF ID tag 10 (FIG. 1) containing a serial number or other such identifying information that is correlated to the catalog and recipient. For example, a serial number of 177349032 is recorded in a database as having been inserted into Krypton catalog, Volume 6, No. 3 mailed to Clark Kent, Smallville, USA on Jan. 20, 2000.

Figure 1:
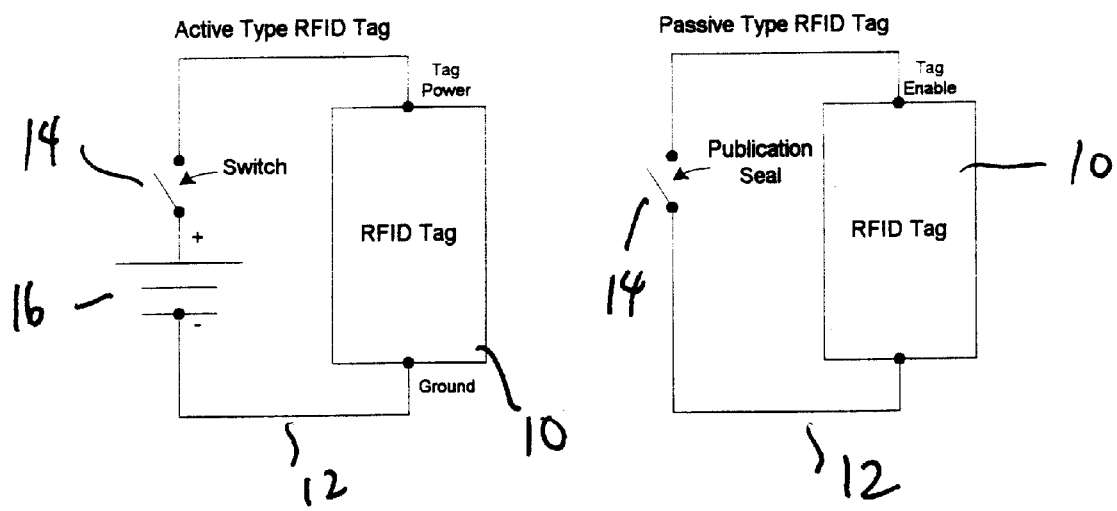
FIG. 1 shows active and passive style RF tags.

Also incorporated into the catalog is a mechanical seal or switch 14 on the cover which completes the circuit to the RF ID tag if the catalog has not been opened, e.g., the wires 12. (FIG. 1 presents a sample of each.) However, the circuit is permanently broken when the magazine is opened, i.e., the seal is broken or the switch is opened. Thus, if the catalog has not been read, the tag will respond to an RF ID scanner with its identifying information. Otherwise, it will not respond at all.

Figure 2:
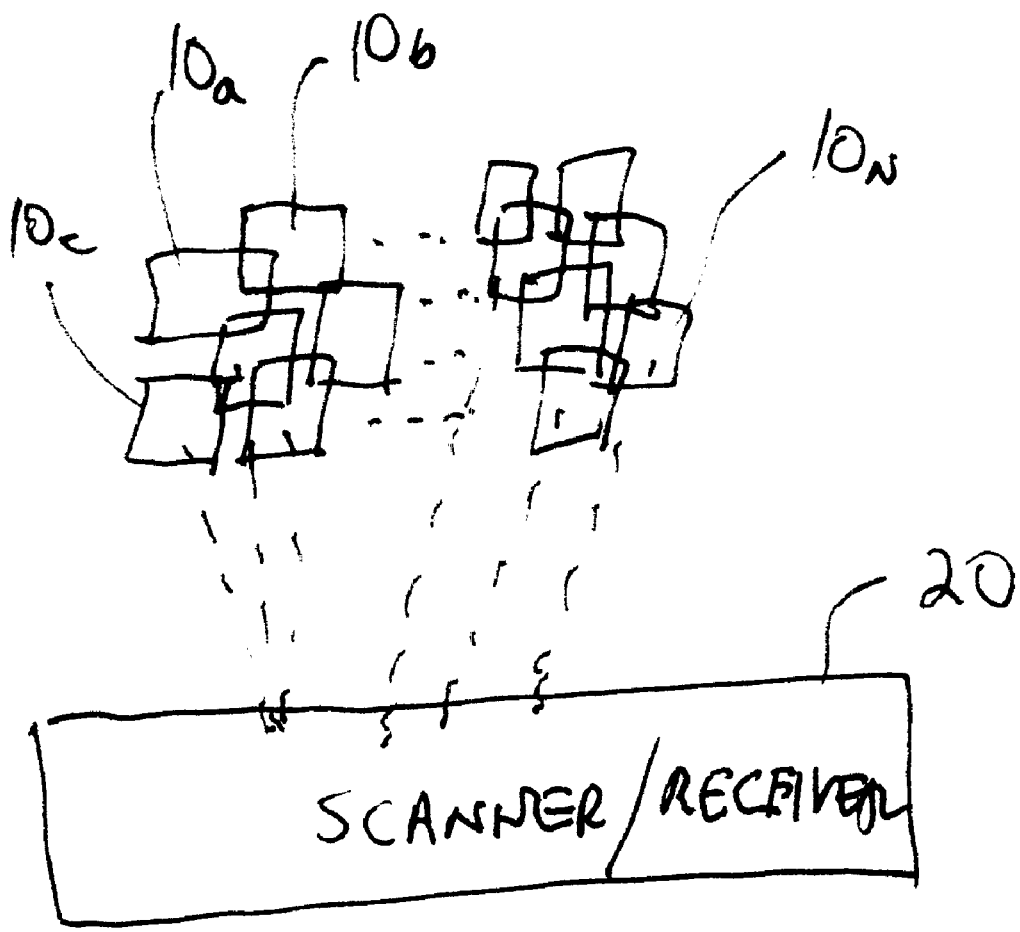
FIG. 2 diagrammatically illustrates a plurality of RF ID tags, in a landfill, garbage collection truck and the like, being scanned with a scanning device.

Typically, publications that are discarded are either collected for recycling or dumped into a municipal landfill. The identifying data from unread publications can be collected in several ways:

1. A tag scanner 20 (FIG. 2) is affixed to each garbage collection (or recycling) truck. As the trash is dumped into the truck, the scanner collects data from enabled RF ID tags 10a, 10b, . . . and 10n.
2. When a collection truck picks up a garbage collection (or recycling) dumpster, a tag scanner 20 is passed over the top of collected material to retrieve data from enabled RF ID tags 10.
3. When a collection truck dumps its contents into a landfill, an adjacent tag scanner retrieves data from enabled RF ID tags as the material passes by.

4. In many communities, trash and recycling is left curbside. A vehicle equipped with a tag scanner drives along the curbside and retrieves data from enabled RF ID tags.

Each of these methods, used separately or in combination, will result in data that must be transmitted to a central computer system for processing. The data from these scanners can be recovered in numerous ways: direct connection to a computer system, via a modem, infrared communications, docking port of a recharging station, wireless communications, etc.

The data from the scanners is sorted by originating retailer (using a portion of the data returned from each RF ID tag to accomplish this) and is transmitted to each retailer for appropriate additional processing.

Note that if a given RF ID tag is scanned multiple times, as might happen if several techniques are combined, or if the discarded catalog is scanned on multiple occasions, no harm is done. While the data will be duplicated, the conclusion is still the same: the corresponding publication was not opened.

The data thus collected may be used by itself or in combination with other data in a number of ways to benefit individual retailers and market research firms:

The data itself reflects on consumers that do not read the publication. When combined with data on consumers that have responded to that publication, the difference relates to those that have read the catalog but have not responded.

Historical data on an individual consumer would indicate whether or not to consider sending future publications.

Geographic data merged with publication non-readership may indicate regions where catalog usage in general and specific types of catalogs is higher or lower than normal.

Combined with demographic data would indicate what types of catalogs would prove an effective marketing tool.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for determining whether marketing materials have been read, the method comprising the steps of:

equipping the marketing materials with respective RF ID tags, wherein each respective tag includes circuitry for wirelessly transmitting tag information, which circuitry will be deactivated if the corresponding marketing material is read;

distributing the marketing material to potential customers;

accumulating material discarded by the potential customers which includes discarded ones of the marketing materials;

deploying a scanner to communicate with discarded ones of the RF ID tags; and collecting information from the RF ID tags which have not been deactivated by the potential customers.

2. The method of claim 1, in which each RF ID tag contains unique information identifying the RF ID tag.

3. The method of claim 2, in which the unique information comprises a serial number.

4. The method of claim 3, in which the serial number identifies the marketing material in which the RF ID tag has been embedded.

5. The method of claim 2, in which the unique information is effective for identifying the marketing material.

6. The method of claim 1, including accumulating the discarded material in garbage collection vessels.

7. The method of claim 1, including a deactivation device with the RF ID tags which is responsive to a potential customer's opening of the marketing material.

8. The method of claim 1, including maintaining potential customer lists and purging from the potential customer lists names of individuals who have not opened marketing materials that have been mailed to them.

9. The method of claim 1, including maintaining historical data on a plurality of the potential customers.

10. The method of claim 1, including collecting information received from the scanner, then correlating geographic data with publication non-readership to indicate regions where marketing material usage is higher or lower than a pre-determined level.

11. The method of claim 1, further including generating information which indicates what type of marketing materials are more effective marketing tools.

12. The method of claim 1, in which the unique information is effective for identifying an addressee of the corresponding marketing material.

13. The method of claim 1, including developing a count of marketing material pieces that have been read.

* * * * *